July 28, 1959     R. B. KINZBACH     2,896,292
AUTOMATIC TUBING SPIDER ASSEMBLY
Filed Jan. 13, 1955     3 Sheets-Sheet 1
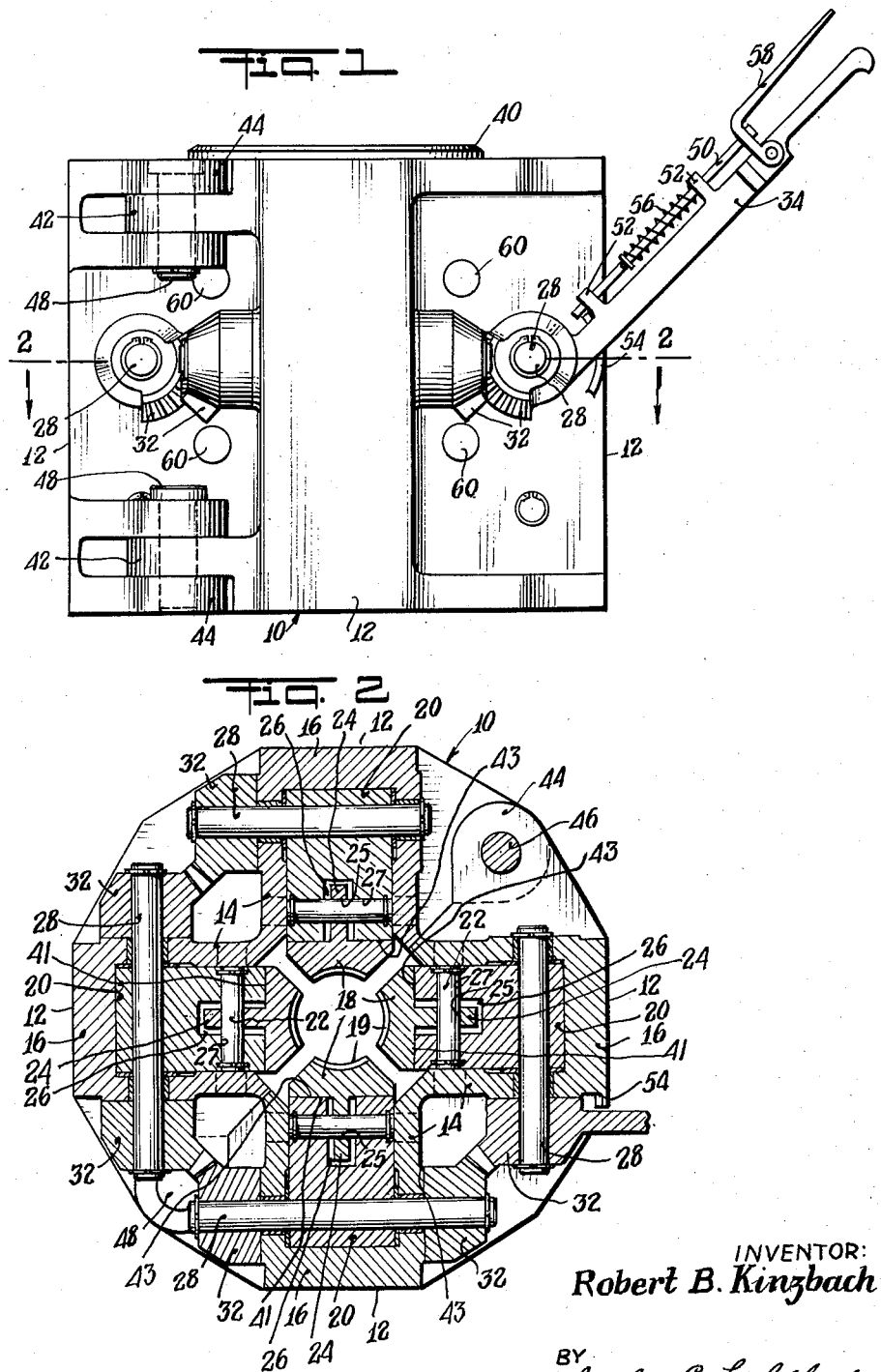
INVENTOR:
Robert B. Kinzbach
BY
Charles E. Lightfoot
ATTORNEY

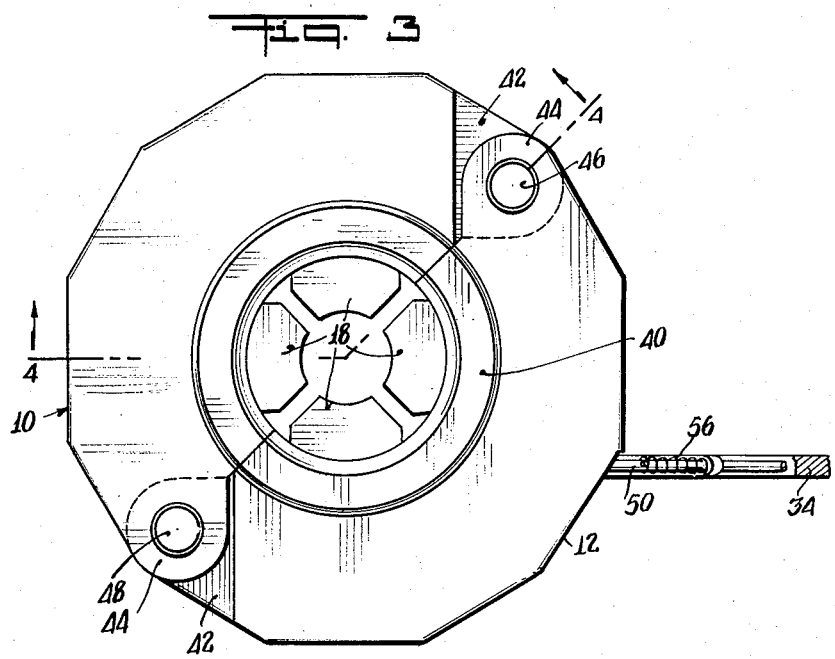
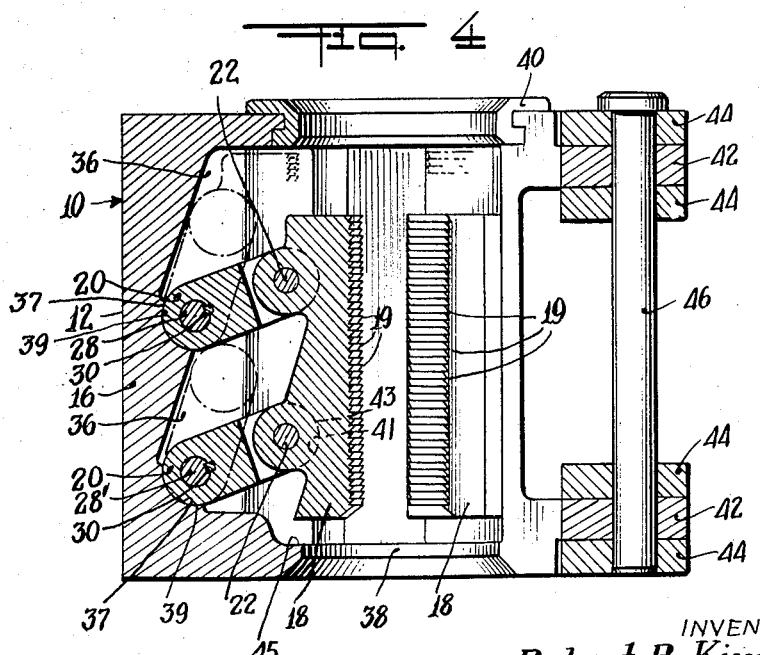

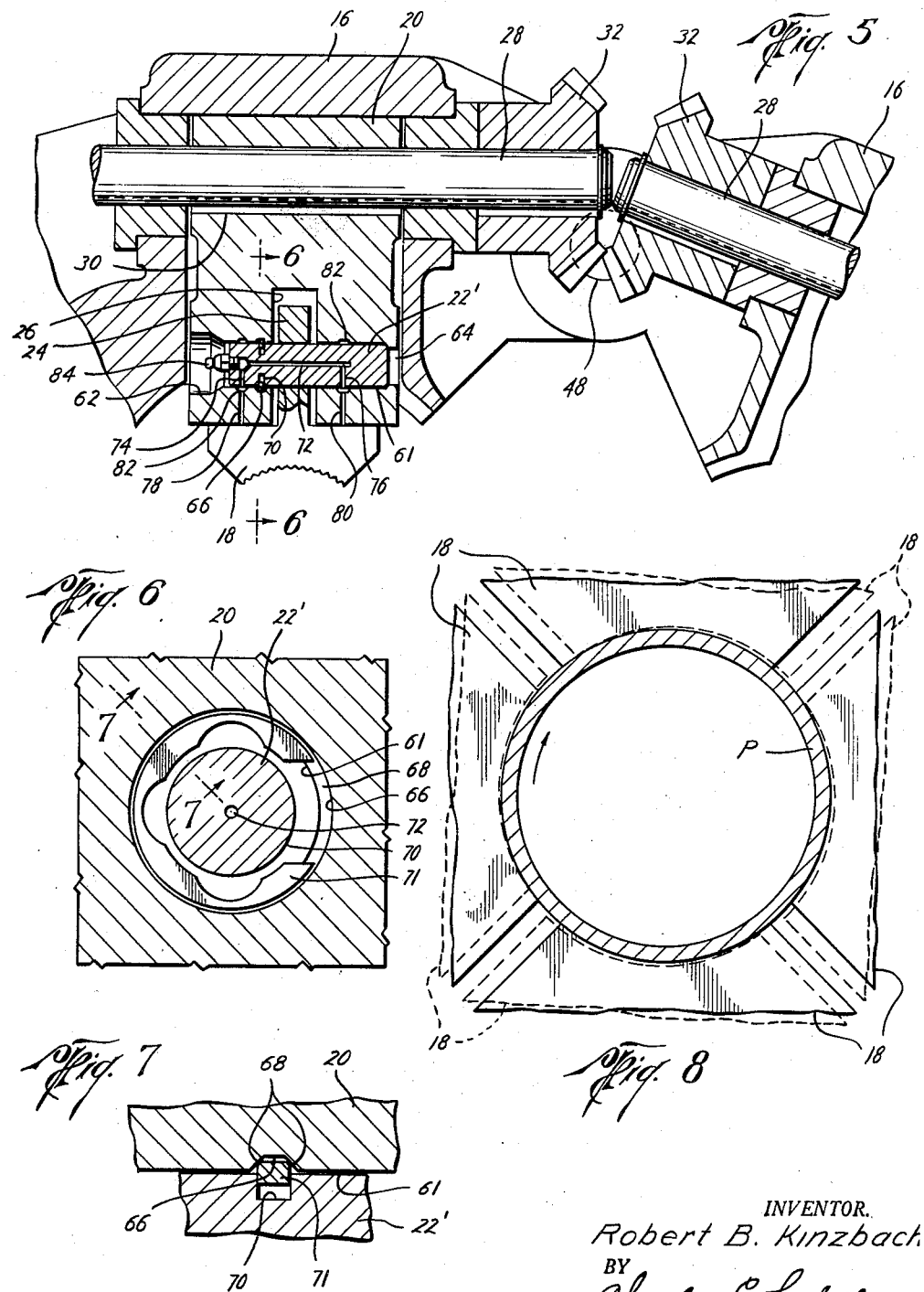

United States Patent Office 2,896,292
Patented July 28, 1959

2,896,292

AUTOMATIC TUBING SPIDER ASSEMBLY

Robert B. Kinzbach, Houston, Tex.

Application January 13, 1955, Serial No. 481,578

6 Claims. (Cl. 24—249)

My invention relates to an automatic tubing spider assembly.

While the invention is especially adapted for use in oil well operations, it relates more broadly to gripping and suspension means and particularly to pipe or rod holding slips.

The gripping or suspension means of the invention may be described in connection with the manipulation of pipes or rods into or out of a well bore, where it is necessary to suspend the portion of the pipe or rod extending into the well bore while sections are added or removed at the upper end or to permit detachment of the hoisting means for other purposes.

Heretofore, various types of wedges and other similar means have been widely employed for the purpose mentioned, which engage and grip the pipe or rod, but such devices present a number of serious disadvantages in use. Great difficulty is frequently encountered, for example, in securing an entirely uniform gripping of the member to be suspended, and there is often a tendency for such means to slip or jar loose under some adverse conditions of operation. The application and adjustment of the conventional forms of gripping means is unsatisfactory and presents serious problems detrimental to their use.

An important object of my invention is to provide gripping and suspension means having a predictable and consistent force of radial closure or gripping in proportion to the magnitude of the suspended load.

Another object of my invention is to provide gripping and suspension means of the type referred to wherein the gripping elements are constructed and operated in a manner to accomplish the true radial closure of the gripping elements through their entire range of movement.

Another object of my invention is the provision of gripping and suspension mechanism wherein the gripping elements move radially in unison and their engaging motion in proximity to the pipe or rod to be gripped is relatively slow in comparison to their rate of retraction as they are withdrawn from gripping contact.

A further object of my invention is to provide a gripping and suspension device wherein the operation of the moving parts may be synchronized and controlled by an application of force at one or more points through the use of any of a wide variety of actuating means.

A further object of my invention is to provide a pipe suspension device whose elements are so connected that the gripping members may not be thrown out of position by the rebound of the suspended pipe or rod, such as that encountered in the premature engagement of the sections while the pipe is being lowered into the well bore.

A further object of my invention is to provide a pipe gripping and suspension device whereby linear sliding of the gripping elements, such as is commonly encountered with the use of wedges, as the elements engage the pipe or rod, is eliminated.

A further object of my invention is to provide gripping and suspension assembly of the type referred to, which is capable of ready adaptation to meet varied installation requirements, and to provide for rapid and easy change of elements to accommodate various diameters of pipes or rods.

Another object of my invention is to provide pipe or rod gripping and suspension mechanism wherein the inner faces of the gripping elements are maintained at all times in parallel relationship with the pipe or rod to be handled.

A further object of my invention is to provide pipe or rod gripping and suspension mechanism having great flexibility in the mounting of the gripping elements to permit effective engagement of the pipe or rod when the same is not accurately centered in the housing and to increase the resistance of the gripping elements to rotative forces, such as those encountered when making or breaking threaded connections in the pipe or rod.

Another object of my invention is to provide gripping and suspension mechanism of the kind referred to wherein substantially constant and uniform bearing contact is established against the backs of the gripping elements, so that adequate gripping force may be applied regardless of variation in the diameter of the pipe or rod, a condition not possible with the conventional conical wedges.

The invention embodies a tubing spider assembly including a spider body formed with radially disposed wings having recesses therein to receive corresponding radially moveable gripping members or segments, pivotally carried on links which are pivotally secured to the spider body. The links are in the nature of cams which are in camming engagement at all times with the gripping members and with the spider body, thus providing supporting connection between the gripping members and the spider body, as well as between the gripping members and the tubing when the members sustain a load.

A tubing spider of the character described has been particularly designed for handling well pipe, either heavy or light, while the same is being run into, or withdrawn from, the wells and in order that the tubing may be securely gripped the inner sides of the gripping members are suitably roughened or toothed. In some cases the tubing spider assembly is seated on the well head and is operatively connected to and driven thereby in the usual way; in other cases the tubing spider assembly is seated in the seat of the rotary table; in this last mentioned case the top of the tubing spider assembly may be arranged substantially at a common level with that of the rotary table. The spider body may be specially shaped to adapt it for positioning in the rotary table and in this case suitable operating means is provided for operating the gripping mechanism.

With the above and other objects in view, the invention has particular relation to certain novel features of construction, operation, and arrangement of parts, as an example of which is given in this specification and illustrated by the accompanying drawings, wherein:

Figure 1 is a side elevational view of the invention;

Figure 2 is a cross-sectional view taken on the line 2—2 of Figure 1;

Figure 3 is a top plan view;

Figure 4 is a cross-sectional view taken on the line 4—4 of Figure 3;

Figure 5 is a fragmentary, horizontal, cross-sectional view of the invention with the two parts of the body in open position, showing the manner in which the link operating mechanism functions when the body is opened, and also illustrating a somewhat modified form of the pivot pin mechanism by which the pipe gripping members are removably secured to the inner ends of the links.

Figure 6 is a cross-sectional view taken along the line 6—6 of Figure 5, looking in the direction indicated by the arrows;

Figure 7 is a cross-sectional view taken along the line 7—7 of Figure 6, looking in the direction indicated by the arrows; and Figure 8 is a fragmentary horizontal cross-sectional view, on an enlarged scale, showing the pipe gripping segments in gripping engagement with the pipe, and illustrating the manner in which the segments function to grippingly engage the pipe to hold the pipe against rotation.

Referring now more particularly to the drawings wherein like numerals of reference indicate similar parts throughout the several views, the numeral 10 designates generally the body of the spider, which in the present illustration is formed with a plurality of opposite, radially extending wings 12, each having spaced vertically disposed side walls 14 and a thickened rear wall 16.

The side walls 14 and rear wall 16 of each wing from a pocket, open toward the center of the body for the reception of one of the gripping members or segments 18 of the spider, which segments are provided with teeth 19 or equivalent means for engagement with the pipe or rod to be gripped. The segments 18 of the spider are each carried on a pair of cam links 20, preferably of equal length pivotally secured to the gripping members by hinge pins 22, the gripping members having hinge lugs 24 received in slots 26 in the cam links. The lugs 24 are each provided with an opening 25 through which hinge pin 22 extends, which pin also extends through aligned openings 27 in the links 20.

The slots 26 are of greater width than the lugs 24 of the segments, so that the segments may move laterally on the hinge pins 22, for alignment with the pipe, and to permit the segments to adjust themselves into gripping relationship with the circumference of the pipe to resist rotational movement of the same.

The upper links 20 have holes therethrough for the passage of shafts 28 which are keyed to the links by keys 30 so that the links swing up and down by rotation of the operating shafts. Shafts 28 are journalled in the opposite walls of the pockets and carry toothed segments, fixed on their outer ends, the toothed segments 32 on one operating shaft meshing with those on the adjacent operating shafts so that the shafts are adapted for simultaneous rotation, whereby all of the links 20 are moved upwardly or downwardly together and to the same extent and the gripping members or segments 18 thereby moved arcuately equal distances inwardly or outwardly in the pockets. One of the toothed segments 32 may be provided with an operating lever 34 for rotating the same. The lower links are pivoted upon pins 28', and are connected for simultaneous movement with the upper links through the segments 18.

The rear walls 16 of the pockets are preferably formed with recesses 36 shaped to receive portions of the links 20 when the same are moved to their retracted positions in order that the segments 18 may be full retracted into the pockets, as best seen in Figure 4. Recesses 36 are formed with cylindrical surfaces 37 with which corresponding cylindrical surfaces 39 of the links engage, and the links also have cylindrical surfaces 41 at their outer ends which bear upon similar cylindrical surfaces 43 of the segments, so that any force applied to the segments tending to move the same outwardly is transmitted directly to the spider body. The arrangement of the cylindrical surfaces 41 of the links bearing upon the similar cylindrical surfaces 43 of the segments and the provision of the hinge lugs 24 of the segments which are of less width than the width of the slots 26 of the links, as shown in Figure 5, also permits lateral movement of the segments relative to the links, as shown in Figure 8, whereby the segments may adjust themselves laterally about the pipe P, whlie at the same time the segments are held against horizontal rotative movement relative to the links. The load is thus uniformly distributed and is carried entirely by the arcuate surfaces of the spider body and segments where the arcuate surfaces of the links engage these parts. Outward movement of the segments to their retracted positions is limited by engagement of the links 20 with the backs of the recesses or pockets, and the lower ends of the segments 18 contact a shouldered portion 45 within the spider body before the links reach horizontal positions or positions in which the inward force of the segments is sufficient to crush the pipe which is being gripped, thus effectively limiting the pressure applied to the pipe to avoid deforming the same, while at the same time assuring a secure gripping of the pipe by the gripping members.

A central opening 38 is provided in the bottom of the body and a similar opening is provided in the top of the body which is in axial alignment with the opening 38, so that a vertical passageway is provided extending entirely through the body, through which a pipe or rod may extend, and within which passage the gripping members move to engage the pipe or rod to be suspended. A guide bushing 40 is secured about the opening at the top of the body to form a wearing surface for the tubing, to limit lateral movement of the pipe in the body, to eliminate contact between the pipe and retracted segments. The guide bushing also serves to limit lateral movement of the pipe in the body.

The body is formed in two sections coupled together, each section having hinge lugs 42 thereon, which fit between spaced pairs of hinge lugs 44 on the other section. At one side of the body the hinge lugs are secured together by a single removable pin 46, and at the other side the hinge lugs are pivoted together by separate short pins 48.

Means are provided for retaining the operating handle in adjusted position, either with the segments retracted or engaged, which means may conveniently take the form of detent mechanism including a rod 50, disposed for sliding movement through perforated lugs 52 formed on the handle 34, and urged into cooperative engagement over a stop 54, or other equivalent structure, by means of a resilient member 56. The rod 50 may be engaged by a pivoted lever 58 for withdrawing the rod from the stop when the handle is gripped in order to shift the operating lever to the desired position.

By releasing the rod 50 from engagement with the stop 54 and moving the lever 34 to its downmost position, the segments are retracted within the body to the positions indicated in dotted lines in Figure 4, wherein the links engage the back walls of the recesses, and the segments are withdrawn so that a pipe extending through the vertical passageway of the spider cannot engage the teeth 19. Engagement of the rod 50 with the lower end of the stop 54 will retain the segments in retracted positions while the spider is in open position and being placed in position about the pipe. Similarly, when the lever is moved to its uppermost position the segments will be in pipe engaging positions and will be retained therein by engagement of the rod 50 with the upper end of the stop 54 to prevent accidental displacement of the segments by rebounding of the pipe or other cause.

Horizontally aligned openings 60 are provided in the side walls 14 which are so located that the links may be moved to position the pins 22 in alignment with the openings to permit the ready removal of the pins, whereby the segments 18 may be conveniently removed and replaced without further dismantling the spider assembly.

In making use of the above described embodiment of the invention, the gripping segments 18 are moved to their fully retracted positions within the pockets of the wings 12 by suitable operation of the operating lever 34, and retained in retracted position by engagement of the detent mechanism. The pin 46 is then removed to permit the body to be opened by swinging the body sections apart about the hinge pins 48. It will be apparent that the gears 32 on shafts 28 will remain in intermeshing engagement when the body is opened, the gears closest to the hinge pins 48 being located close to the axis about which the sections swing open so that they have very little swinging movement relative to each other and the teeth of these gears being of sufficient depth to remain in mesh when the sections of the body are moved apart about the hinge pins. The body is positioned about the pipe or rod to be gripped, closed about the same, and secured in closed condition by reinserting the pin 46 through the hinge lugs. The spider body is then seated on the well head, and the operating handle 34 operated to swing the gripping members 18 inwardly and downwardly, bringing the teeth 19 into gripping engagement with the pipe or rod. In this condition of the assembly the gripping members will be in the positions indicated in Figure 4, with the links 20 sloping upwardly from their operating shafts toward the pivot pins 22 so that any tendency of the pipe or rod to move downwardly through the body results in a movement of the links toward the horizontal and tightening of the gripping members on the pipe or rod. By constructing the assembly with the inner toothed portions of the gripping members arranged vertically and the links 20 of equal length, the gripping members are always parallel to each other and all move simultaneously to the same extent, thus assuring that the gripping of the pipe or rod takes place evenly over the entire length of each gripping member and with substantially the same force in all directions.

The gripping members are made in sets of different sizes which are replaceable in the body, and the segments of each set have their pipe engaging portions of cylindrical formation. In the event that the pipe to be supported is too small in diameter for use with the segments already in the spider body, the segments are replaced by a set of smaller diameter. If the pipe is of slightly larger diameter than the diameter of the pipe-engaging portions of the segments, however, the teeth of each segment will grip the pipe at two peripherally spaced points and effectively prevent slipping of the pipe.

It will be apparent that the movement of each of the gripping members takes place through an arc about the pins 28 as centers, so that the rate of inward movement from released position is relatively great at the start and decreases as the members approach the inward limit of their movement. Thus, engaging motion of the gripping members, when in proximity to the pipe or rod, is relatively slow, while retracting movement may take place more rapidly.

With the segments in gripping engagement with the pipe and the rod 50 in engagement with the upper end of the stop 54, the segments are prevented from being thrown out of engaging position by rebounding of the suspended pipe or rod, but will tend to grip the pipe more tightly upon downward movement of the same. Such a construction of the assembly also eliminates linear sliding of the gripping elements in engagement with the pipe or rod, as is commonly found in the use of wedges or similar gripping means since all pressure on the segments is transmitted through arcuate bearing surfaces which are at all times in bearing contact.

In Figure 5 the body is shown in its fully opened position, the two shafts 32 which are located closest to the hinge pins 48 being positioned for endwise abutment to limit the opening movement of the two parts of the body, while the gears 32 located adjacent the axis about which the parts swing, are still in intermeshing engagement. By this arrangement the gears 32 are prevented from becoming completely disengaged by the endwise engagement of the shafts 28 when the parts are in fully opened position, so that the shafts are held against rotation relative to each other in all positions of the links.

A somewhat modified form of pivoted connection between the segments and links is illustrated in Figures 5, 6 and 7, wherein the links and gripping members are provided with openings positioned for alignment to form pin receiving bores 61 each of which is formed with an enlarged counterbore 62 at one end and with a portion 64 of reduced internal diameter at the other end. The bores 61 are also provided with one or more internal annular grooves 66 whose side walls 68 diverge radially inwardly from the bottoms of the grooves.

Hinge pins 22' similar to the pins 22 are positioned in the bores 61, which pins are provided with external annular grooves 70 which lie opposite the internal grooves 66 when the pins are in place. Expansible, split, snap rings 71, formed of resilient material, are disposed in the grooves 70, which rings may expand into the grooves 66 when the pins are inserted in the bores, to hold the pins against longitudinal displacement therein.

Each of the pins 22' may be formed with a longitudinal, central passageway 72 from which lateral branch passageways 74 and 76 extend to the exterior of the pin, and the links 20 may be formed with internal annular grooves 82 in the bores 61 into which the passageways 74 and 76 open for the purpose of conducting lubricant to the bearing surfaces of the links and pins. Additional passageways 78 may be formed in the links, in communication with the grooves 82 and leading to the bearing surfaces between the links and members 18 to lubricate the same. Suitable means, such as the lubricant fitting 84 may be provided at the outer end of the passageway 72 by which lubricant may be fed into the passageway 72.

The external grooves 70 of the pins 22' are of greater depth than the radial thickness of the snap rings 71, as clearly indicated in Figure 7, so that when the rings are contracted they will move out of the internal grooves 66 into the grooves 70 to permit the pins to be moved out of the bores. It will be apparent that by this arrangement the pins will be securely held against longitudinal displacement in the bores.

Due to the reduced portions 64 of the bores, the pins 22' may only be inserted into the bores through the enlarged counterbores 62 and when so inserted the lubricant fittings 84 will be housed within the counterbores and protected from injury.

Should it be desired to remove the gripping members 18 for replacement, the links 20 may be operated to move the pins 22' into alignment with the opposite openings 60 of the walls 14 of the body, whereupon the pins may be driven out of the bores by any suitable implement inserted through the reduced portions 64. Upon the exertion of a longitudinal force on the pins tending to move the pins out through the counterbores 62, the snap rings 71 will be contracted into the external grooves 70 by engagement with the side walls of the internal grooves 66 to move the rings out of the grooves 66 to release the pins. The members 18 may then be removed and replaced, and the pins again inserted, whereupon the rings will be expanded into engagement with the links in the grooves 66 to hold the pins against displacement.

As best seen in Figure 5, the lugs 24 of the gripping members 18 are of substantially less width than the width of the slots 26, and the members are also of substantially less width than the width of the links, whereby the members may move relative to the links in directions normal to the axis of the pipe to cause the members to center themselves relative to the pipe when moved into gripping engagement therewith. The position which the members 18 will occupy in gripping engagement with the pipe, to suspend the pipe in a stationary condition, is shown in solid lines in Figure 8, wherein the pipe is indicated at P. In the event, however, that a force should be exerted on the pipe, tending to rotate the pipe in the direction indicated by the arrow in Figure 8, such as in the screwing on of an additional section of pipe above the spider assembly, then the members will be moved laterally relative to the links, causing each member to wedgingly engage the pipe along one vertical extremity, as shown in dotted lines in Figure 8, to securely hold the pipe against rotation.

While the invention has been described in connection with a specific embodiment of the same, it will be understood that this is intended to be illustrative only, and numerous changes in the structures and arrangement of the various parts can be made without departing from the spirit of the invention, and within the scope of the appended claims.

This application is a continuation-in-part of my copending application Serial No. 180,871, filed August 17, 1950, now abandoned, for automatic tubing spider assembly.

Having thus clearly shown and described the invention what I claim as new and desire to secure by Letters Patent is:

1. In pipe suspension mechanism, a pipe gripping spider assembly comprising a body adapted to be supported above a well bore and having a vertical passageway therethrough for the reception of a pipe extending into the bore, pipe gripping members in the body and disposed for radial movement into and out of gripping engagement with the pipe, links pivotally connected at their outer ends to the body for vertical swinging movement in the passageway, said links having annular, horizontally disposed openings therethrough near their inner ends and said members having annular, horizontally disposed openings therethrough positioned for alignment with the openings of the links, said links having end faces and said members having surfaces positioned for engagement with said end faces and slidable laterally thereon to hold the members against horizontal rotational movement relative to the body, said members being formed with internal, annular grooves whose side walls diverge radially outwardly, pins extending through the openings in the links and members and having external annular grooves located to be positioned opposite said internal grooves, expansible split rings in said external grooves which are expansible into said internal grooves to releasably hold the pins against longitudinal displacement in the openings, said external grooves being of greater depth than the radial thickness of the rings and the rings being engageable with corresponding side walls of the internal grooves to contract the rings to cause the rings to move out of said internal grooves to release the pins upon the exertion of a longitudinal force on the pins sufficient to cause such contraction.

2. In pipe suspension mechanism, a pipe gripping spider assembly comprising a body adapted to be supported above a well bore and having a vertical passageway therethrough for the reception of a pipe extending into the bore, said body having pairs of spaced walls forming radially disposed pockets opening into said passageway, pipe gripping members in said body and disposed for movement in parallel relation into engaged positions in said passageway in gripping contact with the pipe, and into disengaged positions within said pockets, pairs of vertically spaced links of equal length connected at their outer ends to said body within said pockets, said links having inner end faces and said members having surfaces positioned for engagement with said end faces and slidable laterally thereon to hold the members against horizontal rotational movement relative to the body, said links having annular, horizontally disposed openings therethrough near their inner ends and said members having annular, horizontally disposed openings therethrough positioned for alignment with the openings of the links, said members being formed with internal, annular grooves whose side walls diverge radially outwardly, pins extending through the openings in the links and members and having external annular grooves located to be positioned opposite said internal grooves, expansible ring means in said external grooves which are expansible into said internal grooves to hold the pins against longitudinal displacement in the openings, said external grooves being of greater depth than the radial thickness of the rings and the rings being engageable with corresponding side walls of the internal grooves to contract the rings to cause the rings to move out of said internal grooves to release the pins upon the exertion of a longitudinal force on the pins, said pairs of walls having openings therethrough through which said pins are removable to disconnect the members from the links.

3. In pipe suspension mechanism, a pipe gripping spider assembly comprising a body adapted to be supported above a well bore and having a vertical passageway therethrough for the reception of a pipe extending into the bore, radially movable pipe gripping members in said body, and means for simultaneously moving said members into and out of gripping engagement with the pipe, said means including links operatively connected at their outer ends to said body and having longitudinal end slots opening outwardly at the outer ends of the links, said members having external lugs extending into and pivotally secured to the links in said slots, said slots being of greater width than the width of said lugs to permit lateral movement of the members relative to the links, and said links exceeding the width of said members by an amount greater than the difference between the widths of said lugs and slots, whereby said links will extend laterally beyond the members in all positions of the members on the links, said links and members having surface portions positioned for engagement to hold the members against horizontal rotational movement relative to the links in all positions of the members.

4. In pipe suspension mechanism, a pipe gripping spider assembly comprising a body adapted to be supported above a well bore and having a vertical passageway therethrough for the reception of a pipe extending into the bore, radially movable pipe gripping members in said body, and means for simultaneously moving said members into and out of gripping engagement with the pipe, said means including links operatively connected at their outer ends to said body and having longitudinal end slots opening outwardly at the inner ends of the links, said members having external lugs extending into and pivotally secured to the links in said slots, said slots being of greater width than the width of said lugs to permit lateral movement of the members relative to the links, said links and members having abutting, slidably engageable faces and said links being of greater width than the width of said members whereby said links will extend laterally beyond the members in all positions of the members on the links.

5. In pipe suspension mechanism, a pipe gripping spider assembly comprising a body adapted to be supported above a well bore and having a vertical passageway therethrough for the reception of a pipe extending into the bore, radially movable pipe gripping members in said body, and means for simultaneously moving said members into and out of gripping engagement with the pipe, said means including links operatively connected at their outer ends to said body and having longitudinal end slots opening outwardly at the inner ends of the links, said members having external lugs extending into and pivotally secured to the links in said slots, said slots being of greater width than the width of said lugs to permit lateral movement of the members relative to the links, said links having inner end faces on each side of said slots and said members having surfaces positioned for endwise abutment with said end faces to hold the members against horizontal rotational movement relative to the body and said links being of greater width than the widths of said members whereby said links extend laterally beyond the members in all positions of the members on the links.

6. In pipe suspension mechanism, a pipe gripping spider assembly comprising a body adapted to be supported above a well bore and having a vertical passageway therethrough for the reception of a pipe extending into the bore, radially movable pipe gripping members in said body, and means for simultaneously moving said members into and out of gripping engagement with the pipe, said means including links operatively connected at their outer ends to said body and having longitudinal end slots opening outwardly at the inner ends of the links, said members having external lugs extending into and pivotally secured to the links in said slots, said slots being of greater width than the width of said lugs to permit lateral movement of the members relative to the links, said links having inner end faces and said members having surfaces positioned for engagement with said end faces to hold the members against rotational movement in a horizontal plane relative to the body.

References Cited in the file of this patent

UNITED STATES PATENTS

| | | |
|---|---|---|
| 1,552,062 | Krell | Sept. 1, 1925 |
| 1,659,639 | Smith | Feb. 21, 1928 |
| 1,661,838 | Livergood | Mar. 6, 1928 |
| 1,737,893 | Reed | Dec. 3, 1929 |
| 1,807,286 | Goetz | May 26, 1931 |
| 1,871,562 | Rich | Aug. 16, 1932 |
| 2,173,079 | Moody | Sept. 12, 1939 |
| 2,245,592 | Jones | June 17, 1941 |
| 2,429,782 | Versoy | Oct. 28, 1947 |

FOREIGN PATENTS

| | | |
|---|---|---|
| 21,435 | Great Britain | Sept. 15, 1910 |
| 247,080 | Switzerland | Nov. 17, 1947 |
| 803,203 | Germany | Mar. 1, 1951 |